(12) United States Patent
Tembreull et al.

(10) Patent No.: US 9,903,376 B2
(45) Date of Patent: Feb. 27, 2018

(54) EDDY-CURRENT MAGNET RING

(71) Applicant: BorgWarner Inc., Auburn Hills, MI (US)

(72) Inventors: Vincent M. Tembreull, Cadillac, MI (US); Jason R. Roderick, Cadillac, MI (US); Robert A. Papenfuss, Kaleva, MI (US); Scott W. Tanner, Boon, MI (US)

(73) Assignee: BorgWarner Inc., Auburn Hills, MI (US)

( * ) Notice: Subject to any disclaimer, the term of this patent is extended or adjusted under 35 U.S.C. 154(b) by 284 days.

(21) Appl. No.: 14/625,607

(22) Filed: Feb. 18, 2015

(65) Prior Publication Data
US 2016/0241122 A1 Aug. 18, 2016

(51) Int. Cl.
H02K 49/04 (2006.01)
F04D 25/06 (2006.01)
H02K 49/10 (2006.01)
H02K 1/27 (2006.01)

(52) U.S. Cl.
CPC ........... *F04D 25/06* (2013.01); *H02K 1/2793* (2013.01); *H02K 49/046* (2013.01); *H02K 49/108* (2013.01)

(58) Field of Classification Search
CPC ..... F04D 25/06; F04D 25/026; H02K 49/046; H02K 1/2793; H02K 49/108
USPC .................................................. 417/223, 420
See application file for complete search history.

(56) References Cited

U.S. PATENT DOCUMENTS

| 5,636,719 A | * | 6/1997 | Davis | F01P 7/085 |
| | | | | 192/113.21 |
| 2009/0183963 A1 | * | 7/2009 | Swanson | F16D 25/0632 |
| | | | | 192/48.2 |
| 2010/0282562 A1 | * | 11/2010 | Swanson | F16D 25/0632 |
| | | | | 192/52.5 |
| 2011/0180362 A1 | * | 7/2011 | Swanson | F16D 25/082 |
| | | | | 192/66.1 |
| 2011/0209965 A1 | * | 9/2011 | Lawrence | F16D 27/004 |
| | | | | 192/66.1 |
| 2015/0292576 A1 | | 10/2015 | Settineri et al. | |
| 2015/0295487 A1 | | 10/2015 | Stagg et al. | |

* cited by examiner

*Primary Examiner* — Essama Omgba
*Assistant Examiner* — Stephen Mick
(74) *Attorney, Agent, or Firm* — Harness, Dickey & Pierce, P.L.C.

(57) ABSTRACT

A two-piece magnet retention ring for an eddy-current fan drive mechanism.

10 Claims, 4 Drawing Sheets

EDDY-CURRENT MAGNET RING

TECHNICAL FIELD

The present invention is related to two-speed fan drive assemblies, and more particularly to magnet rings for eddy-current fan drive assemblies.

BACKGROUND OF THE INVENTION

Vehicle engines commonly utilize cooling assemblies to remove excess heat from the engine and maintain an optimal operating temperature. The cooling assembly pumps a coolant through the engine and other components in order to control engine temperature. Heat generated within the engine and other components is absorbed by the coolant and dispersed into the surrounding atmosphere through the use of a radiator. In order to improve dispersal by the radiator, it is common to utilize fan assemblies to draw or force air past the radiator to assist in heat transfer.

It is not generally desirable for such fan assemblies to be run continuously. It is desirable to maintain a targeted coolant temperature; high fan speed is only needed during times of high heat generation. Additionally, continuous high speed operation when unnecessary places a non-required draw on the engine and thereby reduces efficiency. To compensate for this, present fan assemblies, such as "On-Off" style fan drives, utilize fan clutch assemblies that allow for the selective engagement of the fan to the engine such that the fans are engaged only when necessary. The fan clutch assemblies may be operated in a host of configurations including electronic, hydraulic and air-pressure actuated. It is common for these systems to be biased towards fan operation such that when failure occurs in the clutch assembly, the fan continuously operates to keep the engine cool.

Most On-Off fan drives operate at only one speed when actuated, namely input speed. In some situations, two-speed fan drives are desired. These drives often utilize an eddy-current mechanism to allow the fan drive to operate at a lower speed. The eddy-current assemblies provide for a much slower fan rotation when the fan is disengaged.

One concern with eddy-current clutches, or "On-Off" accessory drives combined with eddy-current drive assemblies, are the structure and effectiveness of the magnet rings and flux rings. In order to have the most efficient, effective and durable ring components, they must be manufactured and assembled in a precise manner, and also have the most effective and precise designs.

It would be highly beneficial in particular, if the magnet rings for eddy-current clutch assemblies could be provided which position, hold and present the magnets in an optimum manner. This would provide a more durable, longer lasting and more effective eddy-current assembly.

SUMMARY OF THE INVENTION

The present invention provides methods, structures and systems for manufacturing and using improved flux rings for eddy-current assemblies. The invention provides magnet rings that are manufactured, assembled and provided in an improved manner and provide a better performing eddy-current assembly.

In accordance with a preferred embodiment of the invention, the magnet ring comprises two separate annular ring members fixedly attached together. The base ring is a backing ring for a second "magnet positioning ring" which positions and holds the magnets. The magnet positioning ring has sets of openings in which individual magnets are positioned and retained. As with conventional eddy current mechanisms, the magnets are positioned in pairs around the annular ring.

The inventive magnet ring positions and holds the magnets at a uniform height relative to the upper surface of the ring which prevents inefficiencies and variations in performance. By controlling the gap between the magnets and the flux ring, a more efficient eddy-current assembly is achieved. The backing and magnet retainer rings are both made of a steel material and are fixedly secured together, such as by welding or gluing. The magnets also can be glued in place, if desired.

The present invention also provides an eddy-current fan drive assembly which is more efficient to manufacture and assemble, as well as having a more efficient performance.

Other features, benefits and advantages of the present invention will become apparent from the following description of the invention in conjunction with the drawings and appended claims.

DESCRIPTION OF PREFERRED EMBODIMENTS

Figure 1:
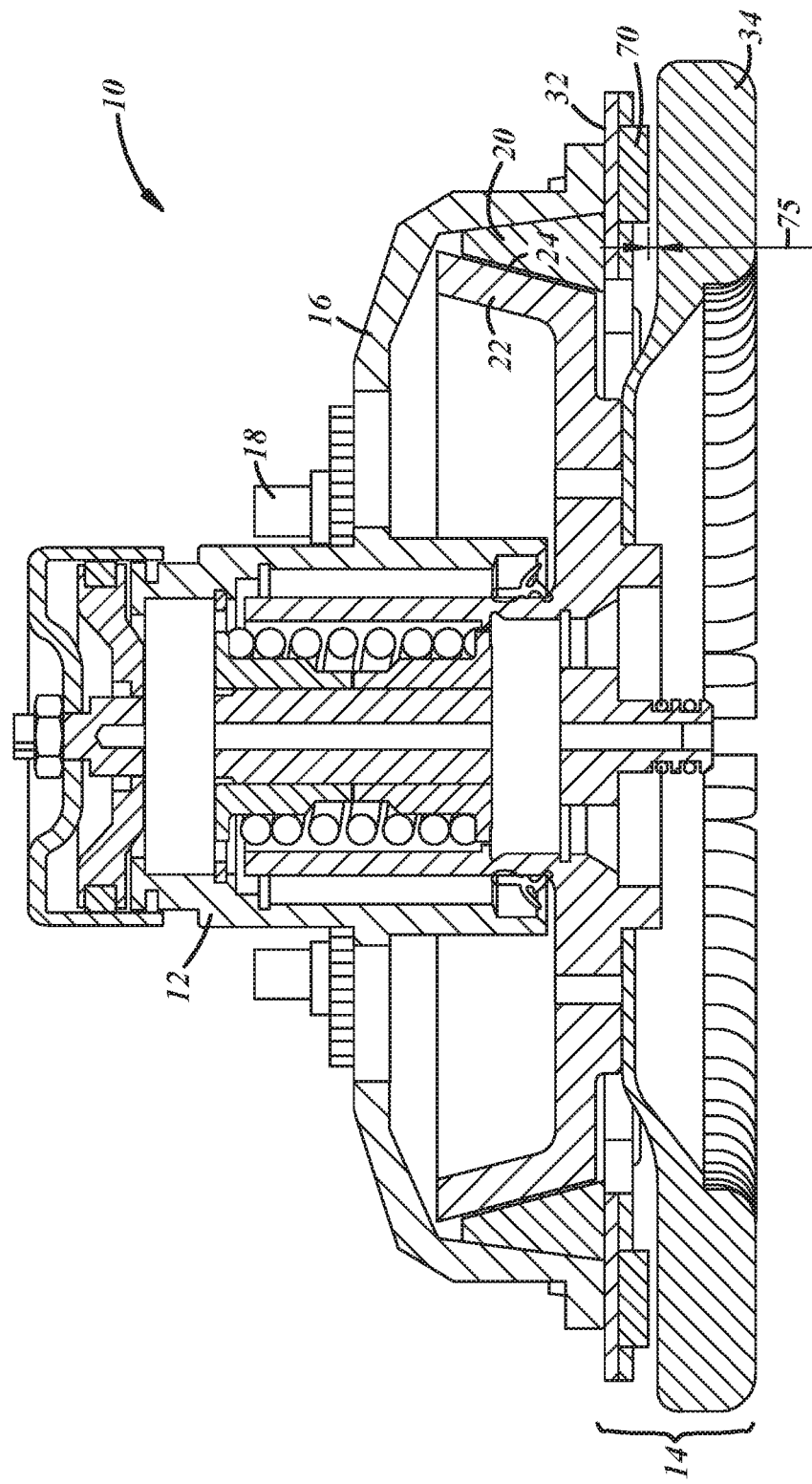
FIG. 1 depicts a two-speed fan drive which includes an eddy-current drive assembly, incorporating a preferred embodiment of the present invention.

FIG. 1 depicts a two-speed fan drive assembly 10 in accordance with the invention. It includes a pneumatic friction clutch mechanism 12 and an eddy-current fan drive mechanism 14.

The operation of two-speed fan drive assemblies as exemplified by assembly 10 are well known, and it is not necessary to describe all aspects of it here. Such assemblies are depicted and described, for example, in U.S. Pat. Nos. 5,994,810, 6,838,796 and 8,544,627, as well as United States Publication 2011/0180362.

For purposes of the present invention, the two-speed fan drive assembly 10 will be briefly described. It has a pneumatic activated spring-biased clutch mechanism that is configured to selectively move an outer housing member 16 along a rotational axis of an inner actuating member 22. A fan (not shown) is attached to the outer housing member 16, such as by conventional threaded studs 18. The inner actuating member 22 is attached to a pulley member (not shown) and is constantly rotating at input speed by an appropriate engine belt (not shown). An annular friction backing member 20 having opposite frusto-conically shaped surfaces is disposed between a frusto-conical surface formed on the outer housing member 16 and a frusto-conical surface formed on the inner actuating member 22. A material 24 is positioned on and preferably bonded to one of the friction backing member 20 and the inner actuating member 22.

When demand for cooling is sufficiently high, the assembly 10 is operated in a first condition in which no pneumatic pressure is applied to a clutch mechanism in the assembly 10. In this condition, the clutch mechanism positions the outer housing member 16 along the rotational axis so that it drives the friction backing member 20 into engagement with the inner actuating member 22. Engagement between the mating frusto-conical surfaces of the inner actuating member 22 and the friction backing member 20 and between the mating frusto-conical surfaces of the friction backing member 20 and the outer housing member 16 resists relative rotation between the inner actuating member 22 and the outer housing member 16. Since the inner actuating member 22 is driven by the engine pulley, and since the fan is coupled to the outer actuating member 16 for rotation therewith, placement of the outer housing member 16 in this position while the engine is operating will cause the fan to rotate at the rotational speed of the inner actuating member 22 (i.e., at input speed).

At times where demand for cooling is sufficiently low, the assembly can be operated in a second condition in which pneumatic pressure is applied to the clutch mechanism in the housing assembly 10 to cause the clutch mechanism to translate the outer housing member 16 axially away from the inner actuating member 22 to disconnect the friction backing member 20 from the inner actuating member 22 to thereby inhibit power transmission between the inner actuating member 22 and the outer housing member 16 between the friction backing member 20. In this condition, the frusto-conical surfaces of the friction backing member 20 and the inner actuating member 22 are spaced apart from one another along the rotational axis of the inner actuating member 22.

There are many reasons why it is desirable to keep the fan rotating in the vehicle even when it is not necessary to rotate it at input speed. The eddy-current mechanism 14 provides for rotation of the housing and fan member at a second speed lower than the input speed.

The basic components of the eddy-current mechanism 14 are a plurality of permanent magnets 30 positioned on an annular magnet ring member 32, along with an associated flux ring member 34. Even though power from the frictional contact has ceased, the eddy-currents induced by the magnets and the flux ring keep the housing and connected fan member rotating at a slower speed. (For example, at about 500-600 rpm.)

Typically, the flux ring is made of an electrically-conductive material, such as aluminum or steel. The flux ring is connected to the pulley member and rotates at input speed. The magnets 70 in the magnet ring need to be positioned appropriately around the annular magnet ring and need to be positioned such that a uniform gap 75 is provided around the circumference of the eddy-current drive 14. The magnets are preferably positioned in paired sets around the annular magnet ring.

The present invention has been provided in order to improve on the structure and performance of magnet rings for eddy-current assemblies. The invention has particular use in two-speed fan drive assemblies, as exemplified by the assembly 10 described above.

A preferred embodiment of a flux ring member includes a metal base member with sections of another metal material overmolded on it, together with features which provide improved (reduced) radial expansion and increased cooling of the flux ring. Such an embodiment is disclosed in application U.S. Ser. No. 61/978,844, filed on Apr. 14, 2014, the disclosure of which is hereby incorporated by reference herein. It is also possible in accordance with the present invention, to use any other conventional flux ring with the improved magnet ring member disclosed and claimed herein. The flux ring is attached to the pulley and rotates at input speed.

Figure 2:
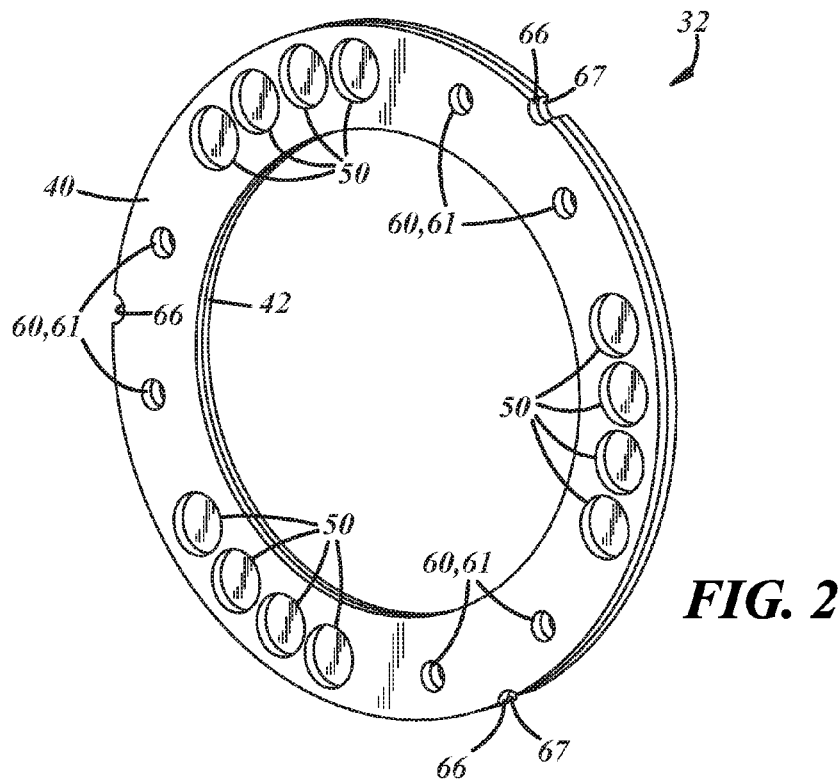
FIG. 2 depicts a perspective view of a magnet ring in accordance with an embodiment of the present invention.
Figure 3:
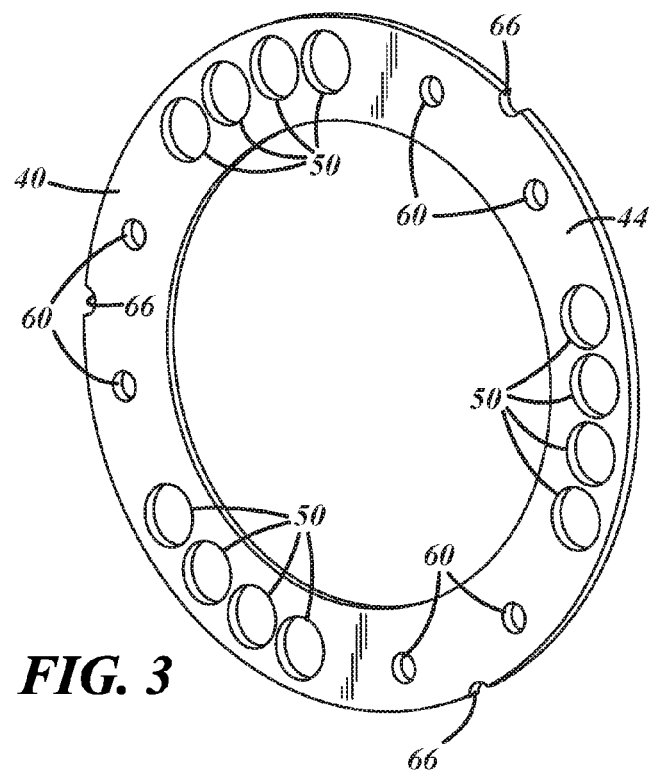
FIGS. 3 and 4 depict the magnet positioning ring in a perspective and planar manner.
Figure 4:
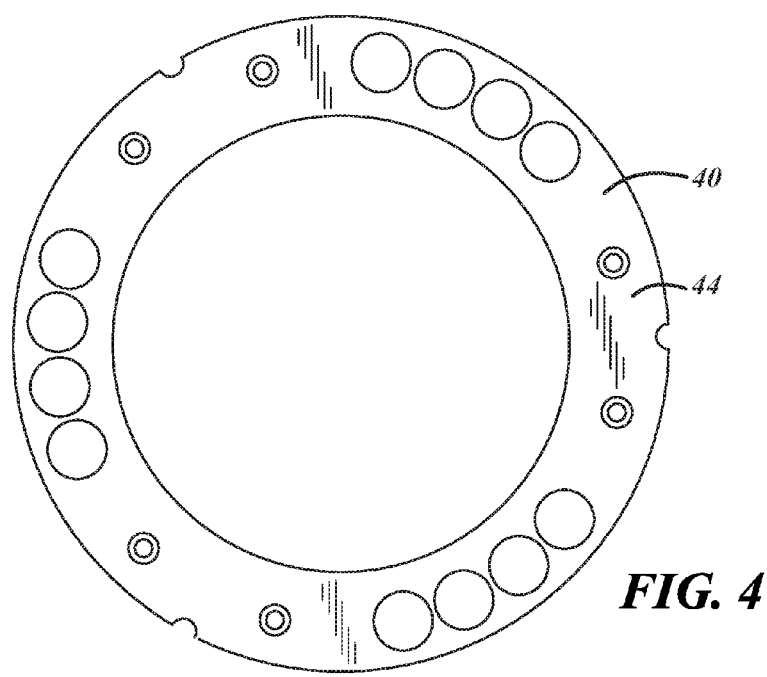
Figure 5:
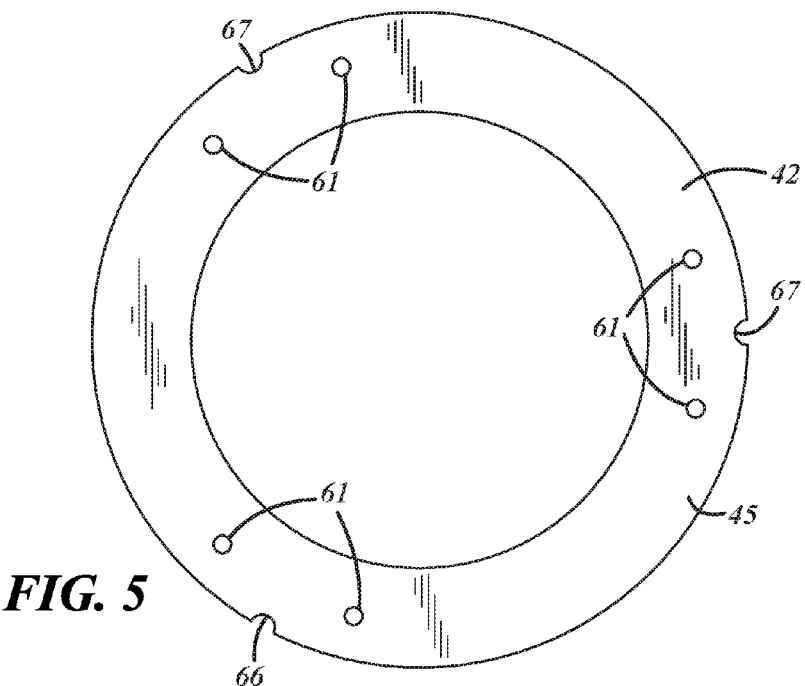
FIG. 5 depicts a backing ring.

The preferred embodiment for the magnet ring 32 is shown in FIG. 2. The two basic components which are fixed together to form the magnet ring 32 are shown in FIGS. 3-5. The magnet ring 32 includes a magnet retention ring 40 and a base member ring 42. Both rings are annular in shape with a circular circumference. Both rings are made from a strong durable material, such as steel. Standard steel sheet stock, such as 1010 or 1008 steel, is a preferred material. It is also preferable to coat or plate each of the rings 40, 42 with a corrosion resistant material, such as hex-free plating.

The base member 42, as shown in FIG. 5, has flat planar surfaces on both sides and has a uniform thickness throughout. Similarly, magnet retention ring 40 has flat planar surfaces on both sides and has a uniform thickness, apart from the magnet openings 50.

Each ring, 40, 42, has a plurality of mounting openings 60, 61 which are aligned with each other and used to secure the complete magnet ring 32 to the friction clutch mechanism 12. For assembly of the magnet ring to the friction clutch mechanism 12, fasteners, such as threaded bolts (not shown) are positioned through the aligned openings 60, 61.

The two annular rings 40, 42 also have a plurality of mating alignment notches 66, 67 on their outer circumferences (or peripheries). The notches are utilized during assembly of the magnet ring 32 to align the rings 40 and 42 and hold them in position while they are being secured together.

The two rings 40, 42, are fixedly secured together in any conventional manner, such as by welding or gluing.

Figure 6:
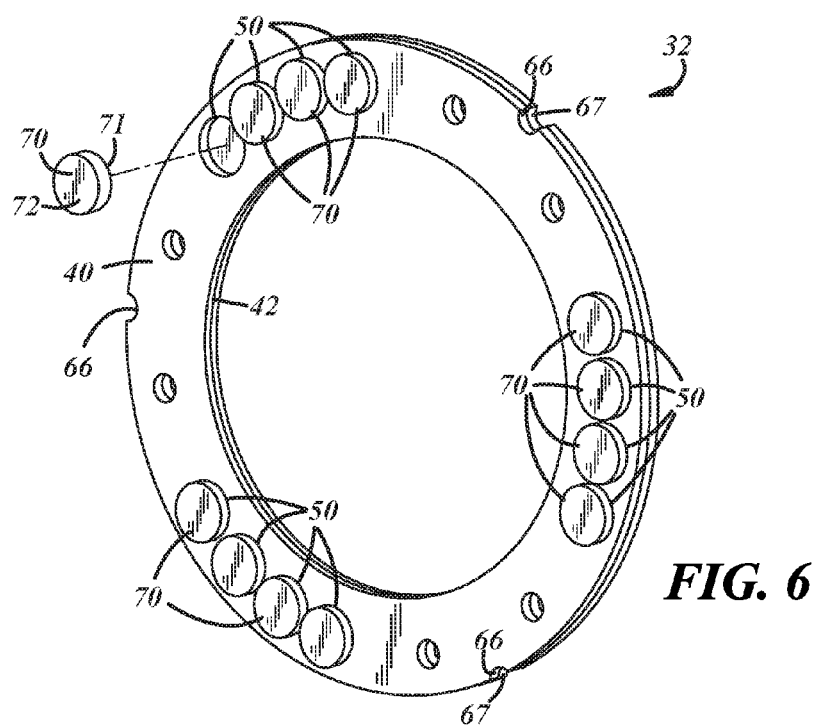
FIG. 6 depicts a completed two-piece ring with magnets assembled in place.

After the two rings 40, 42 are secured together to form the magnet ring 32, individual magnets 70 are positioned in each of the openings 50. This is shown in FIG. 6. In this embodiment, the magnets are cylindrical in shape with a circular cross-section. The magnets and openings could have any shape as desired. The magnets can be merely positioned in each of the holes (a/k/a "openings") in the magnet retention ring 40, or they can be further fixed in place, such as by gluing. Normally, the magnetic attraction of the magnets 70 to the metal ring 42, is sufficient to hold the magnets tightly and firmly in position in the openings 50.

As is known in the art, the magnets for an eddy-current fan drive mechanism are positioned in pairs, each with an opposite polarity. This is conventional in the art and further explanation is unnecessary. The number of the magnets utilized on the ring depends on many factors, such as the desired speed of the eddy current mechanism. Although twelve magnets (six pairs) are shown in the drawings, that number and geometry are not critical.

Each of the magnets 70 has a base surface 71 which contacts and rests on the mating planar surface 45 of the base ring member 42. Each of the magnets 70 also has an upper surface 72 which preferably extends slightly above the planar surface 44 of the magnet retention ring 40. It is also possible for the upper surface 72 of the individual magnets 70 to be flush (or even) with the planar surface 44, or even slightly below the surface.

In one preferred embodiment of the invention, the two rings 40, 42 have an external diameter of 220 mm, and an internal diameter of 154 mm, and a thickness of 4.5 mm in the assembled state 32. In addition, the magnet holes have a diameter of 20 mm, and the magnets have a diameter of 19.05 mm and a height of 5.08 mm.

The present invention has significant advantages over one-piece magnet rings in use today. With one-piece magnet rings, the holes (or "openings") for the magnets are machined into the ring by drilling or plunge cutting. As such, it is difficult to create the openings all having precisely the same depth. Any significant variation in the height of the magnets in a magnet ring can affect the performance of the eddy-current mechanism, and create non-uniformity in the lower speed of the fan drive.

With a separate magnet retention ring 40 in accordance with the present invention, the holes or openings 50 can be formed by laser cutting or machine stamping. This procedure is more economical than drilling or plunge cutting, and creates virtually perfect openings each time. In addition, the heights of the magnets 70 that protrude above, or even with the upper surface 44 of the magnet retention ring 22, are consistent and uniform. This creates a controlled gap 75 (as shown in FIG. 1) between the magnets 70 and the flux ring 34. Preferably, the gap 75 is about 1-2 mm. This also creates a more efficient eddy-current curve.

Figure 7:
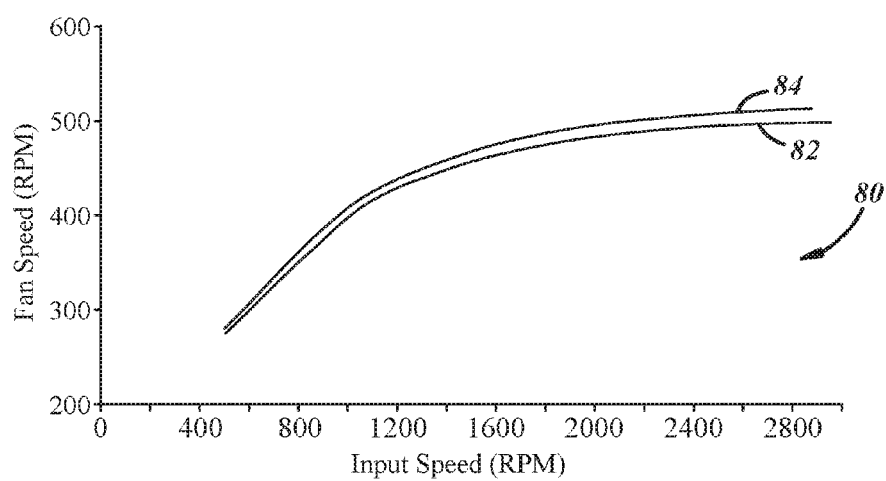
FIG. 7 is a graph showing the performance of the inventive ring.

FIG. 7 is a graph 80 comparing the fan speed output verses input speed for a one piece magnet ring 82 and a two-piece magnet ring 84. The two-piece magnet ring 84 exhibited a 5 rpm increase (efficiency improvement) in disengaged fan speed on average throughout the input speed range when comparing to the one-piece magnet plate design 82 (nine magnet configuration).

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A fan drive assembly comprising:
   a clutch input member defining a first frusto-conical surface and being rotatable about an axis;
   a clutch output member defining a second frusto-conical surface disposed about the first frusto-conical surface, the clutch output member being movable along the axis between a first position and a second position;
   an annular friction member having a third frusto-conical surface and a fourth frusto-conical surface; and
   a magnet retention ring having a first annular member, a second annular member and a plurality of magnets, the first annular member having first and second axial ends and a plurality of through-holes that intersect the first and second axial ends, the second annular member having third and fourth axial ends, the second annular member being fixedly coupled to the first annular member such that the second and third axial ends abut one another, each of the magnets being received in an associated one of the through-holes and being fixedly engaged to the third axial end of the second annular member;
   wherein a plurality of threaded fasteners secure the magnet retention ring to the clutch output member, wherein the magnet retention ring secures the annular friction member within the clutch output member such that the fourth frusto-conical surface is engaged to the second frusto-conical surface, wherein placement of the clutch output member in the first position permits relative rotation between the clutch input member and the clutch output member, and wherein placement of the clutch output member in the second position frictionally engages the third frusto-conical surface on the annular friction member to the first frusto-conical surface on the clutch input member to thereby resist relative rotation between the clutch input member and the clutch output member.

2. The fan drive assembly of claim 1, wherein each of the magnets abuts the third axial end.

3. The fan drive of claim 1, wherein each of the magnets protrudes from the first annular member in a direction away from the second axial end and outwardly past the first axial end.

4. The fan drive of claim 1, wherein the first, second and third axial ends are flat and parallel to one another.

5. The fan drive of claim 1, further comprising a flux ring member that is coupled to the clutch input member for rotation therewith.

6. The fan drive of claim 1, wherein the second annular member is formed of steel.

7. The fan drive of claim 6, wherein the first annular member is formed of steel.

8. The fan drive of claim 1, wherein the first and second annular members are welded together.

9. The fan drive of claim 1, wherein the first and second annular members are adhesively bonded together.

10. The fan drive of claim 1, wherein an adhesive is disposed between each magnet and the third axial end of the second annular member.

* * * * *